United States Patent
Byerley

(10) Patent No.: US 8,056,597 B2
(45) Date of Patent: Nov. 15, 2011

(54) CAM FOLLOWER ASSEMBLY FOR THIN WALLED CYLINDER OF SCROLL SHAPING DRUM USED IN TIRE CONSTRUCTION

(75) Inventor: Mark S. Byerley, Greenback, TN (US)

(73) Assignee: BPS Engineering, LLC, Greenback, TN (US)

( * ) Notice: Subject to any disclaimer, the term of this patent is extended or adjusted under 35 U.S.C. 154(b) by 388 days.

(21) Appl. No.: 12/384,715

(22) Filed: Apr. 8, 2009

(65) Prior Publication Data

US 2009/0255634 A1    Oct. 15, 2009

Related U.S. Application Data

(60) Provisional application No. 61/123,923, filed on Apr. 10, 2008.

(51) Int. Cl.
*B29D 30/26* (2006.01)
(52) U.S. Cl. ........................ 156/417; 156/414
(58) Field of Classification Search ............ 156/414, 156/415, 416, 417, 418, 419, 420; 411/338, 411/339; 403/263, 334
See application file for complete search history.

(56) References Cited

U.S. PATENT DOCUMENTS 6,116,695 A * 9/2000 Heidmann et al. ......... 297/463.1
2006/0214128 A1 * 9/2006 Horner et al. ................. 251/305

* cited by examiner

*Primary Examiner* — Richard Crispino
*Assistant Examiner* — Martin Rogers
(74) *Attorney, Agent, or Firm* — Michael E. McKee

(57) ABSTRACT

A scroll shaping drum useful in the construction of tires and including an internal air cylinder having an inner sleeve member and a roller member positioned about the inner sleeve member includes a plurality of cam follower assemblies anchored within the inner sleeve member. Each cam follower assembly includes a hub and a cam follower member positioned about the hub, and the cam follower member of each assembly is accepted by an appropriately-shaped slot defined in the roller member. The inner sleeve member defines an internally-threaded opening for accepting the hub of each assembly, and each hub includes a mounting portion positioned within a corresponding internally-threaded opening of the inner sleeve member. In addition, an externally-threaded insert member having a length which is larger than the thickness of the wall of the inner sleeve member is threadably accepted by the internally-threaded opening of the inner sleeve member and has a central through-opening within which the mounting portion of the hub is force-fitted.

19 Claims, 3 Drawing Sheets

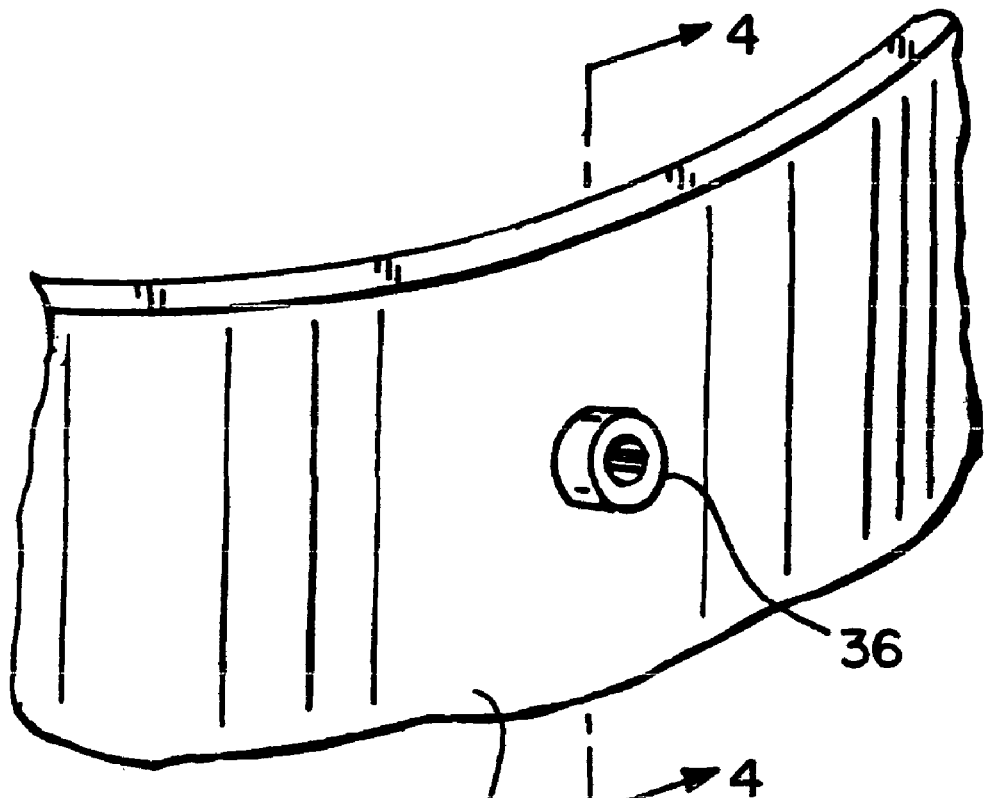
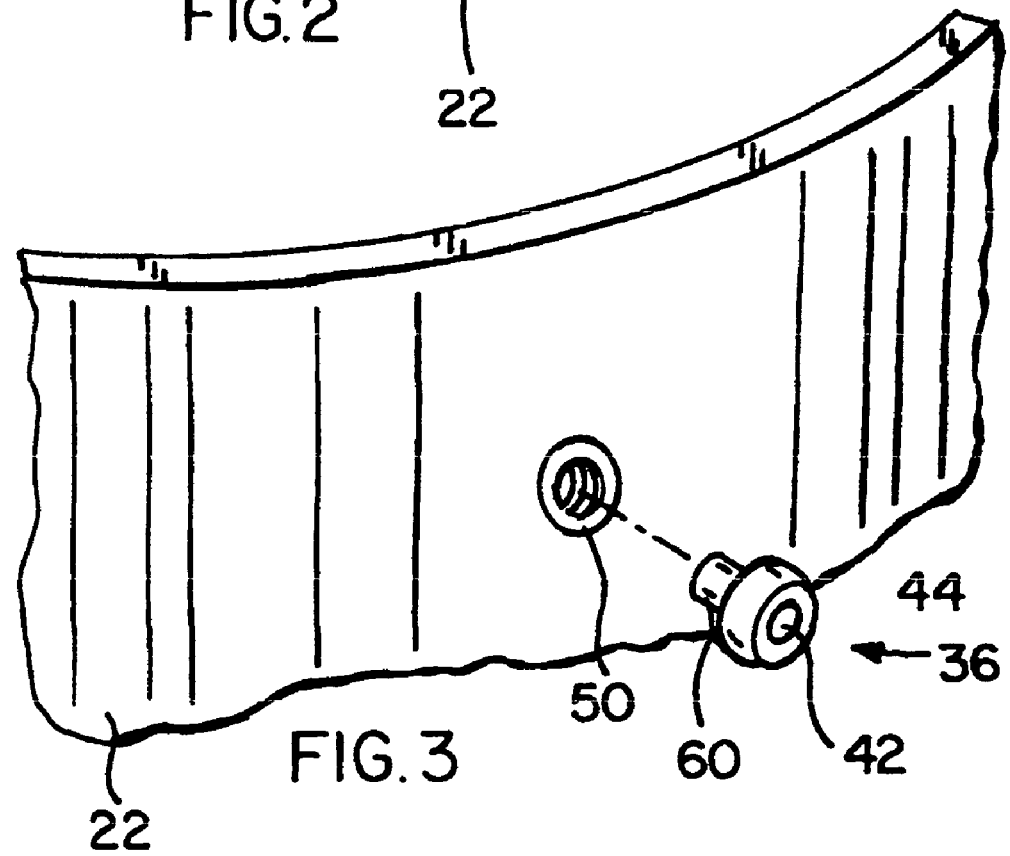

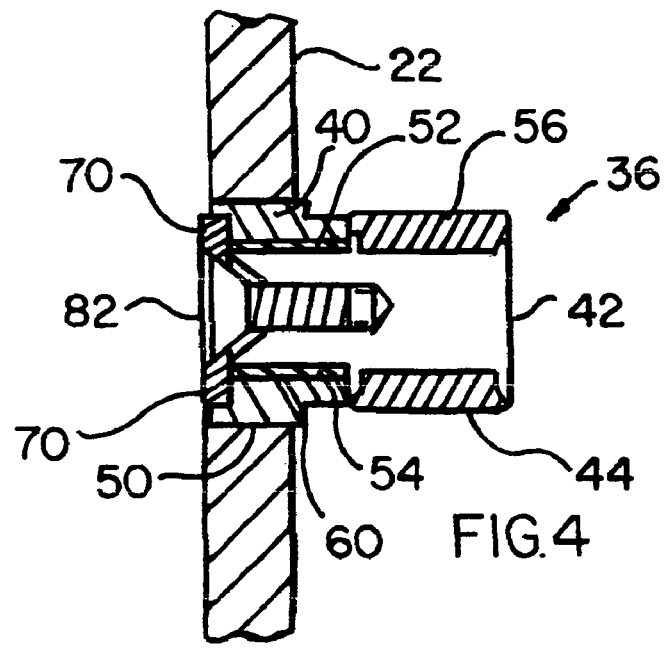
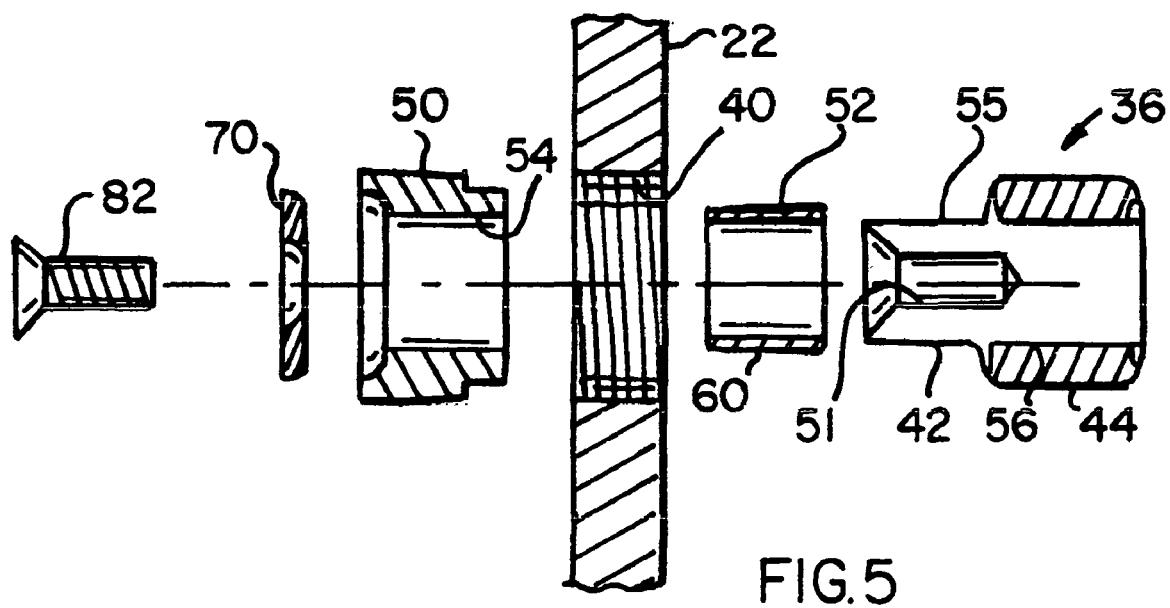

CAM FOLLOWER ASSEMBLY FOR THIN WALLED CYLINDER OF SCROLL SHAPING DRUM USED IN TIRE CONSTRUCTION

The benefit of Provisional Application Ser. No. 61/123,923, filed Apr. 10, 2008 and entitled CAM FOLLOWER ASSEMBLY FOR THIN WALLED CYLINDER OF SCROLL SHAPING DRUM USED IN TIRE CONSTRUCTION, is hereby claimed. The disclosure of this referenced provisional patent application is incorporated herein by reference.

BACKGROUND OF THE INVENTION

This invention relates generally to a scroll shaping drum used in tire construction and relates, more particularly, to the means by which components of the shaping drum are made to follow a predetermined path as an internal air cylinder within the shaping drum is actuated or de-actuated.

The class of scroll shaping drums with which this invention is to be compared includes those which have an internal air cylinder whose inner wall is provided by the outer cylindrical surface of a sleeve member (i.e. of thin wall construction) and whose outer wall is provided by the inner surface of a roller member encircling the sleeve member. The roller member supports a plurality of linkage members which are pivotally connected thereto and which are partly responsible for the expansion and contraction of the diameter of the shaping drum as the linkage members are guided between collapsed and expanded conditions as the roller member is moved vertically along the sleeve member in response to the actuation and de-actuation of the internal air cylinder.

Furthermore, there is provided between the sleeve member and the roller member positioned thereabout a plurality of cam follower assemblies which are each anchored within the inner sleeve member by way of a hub and has a cam follower member secured about the hub. Furthermore, the cam follower members of these cam follower assemblies are slidably accepted by appropriately-shaped slots defined in the roller member so that upon actuation or de-actuation of the internal air cylinder, the roller member is urged along the length of the sleeve member as the movement of the roller member is guided by the cooperation between the cam follower members and the slots defined in the roller member.

Heretofore and after several cycles, or prolonged use, of a shaping drum of the aforedescribed class, the cam follower assemblies, and in particular, the hubs thereof, have broken in two and permitted the cam follower members thereof to free themselves from the roller member slots within which they are accepted. If, however, the cam follower members are ever freed from the roller member slots, the shaping drum is rendered inoperative.

It would be desirable to provide a new and improved shaping drum of the aforedescribed class whose cam follower assemblies are provided with an improved resistance to damage which can result from repeated cycling of the shaping drum.

Accordingly, it is an object of the present invention to provide a new and improved shaping drum having a construction which provides its cam follower assemblies with an increased resistance to damage due to repeated cycling, or prolonged use, of the shaping drum.

Another object of the present invention is to provide such a new and improved shaping drum whose construction enables its cam follower assemblies to resist forces to which the cam follower assemblies are normally exposed during use of the shaping drum.

Still another object of the present invention is to provides such a new and improved shaping drum which is uncomplicated in structure, yet effective in operation.

SUMMARY OF THE INVENTION

This invention resides in a scroll shaping drum useful in the construction of tires and including an inner, thin-walled sleeve member having a wall defining inner and outer cylindrical surfaces, a roller member positioned about the inner sleeve member and defining an inner cylindrical surface, and an air cylinder wherein an interior wall of the air cylinder is provided by the outer cylindrical surface and an exterior wall of the air cylinder is provided by the inner cylindrical surface of the roller member. Furthermore, there is provided within the scroll shaping drum a plurality of cam follower assemblies wherein each cam follower assembly is anchored within the wall of the inner sleeve member by way of a hub and has a cam follower member positioned about the hub and which is accepted by an appropriately-shaped slot defined in the roller member so that upon actuation or de-actuation of the air cylinder, the roller member is forced along the length of the inner sleeve member as the movement of the roller member is guided by the cooperation between the cam follower members and the slots defined within the roller member.

The improvement is characterized in that the inner sleeve member defines an opening in the wall thereof, and the hub of each cam follower assembly includes a mounting portion which is positionable within the opening of the inner sleeve member and a support portion about which a cam follower member is supported. In addition, there is provided an insert member which is adapted to be accepted by the opening of the inner sleeve member and which has a central through-opening within which the mounting portion of the hub is positioned. The insert member has a length which exceeds the thickness of the wall of the inner sleeve member so that the mounting portion of the hub is surrounded by and thereby reinforced by a greater amount of material than would be the case if the mounting portion were only surrounded by and reinforced by the material of the wall of the inner sleeve member.

BRIEF DESCRIPTION OF THE DRAWINGS

FIG. 2 is a perspective view of a fragment of the FIG. 1 view, but drawn to a slightly larger scale.

FIG. 3 is a perspective view like that of FIG. 2, but shown with the cam follower member removed from the remainder of the cam follower assembly.

FIG. 4 is a cross-sectional view taken about along line 4-4 of FIG. 2.

FIG. 5 is a view like that of FIG. 4, shown exploded.

DETAILED DESCRIPTION OF AN ILLUSTRATIVE EMBODIMENT

Figure 1:
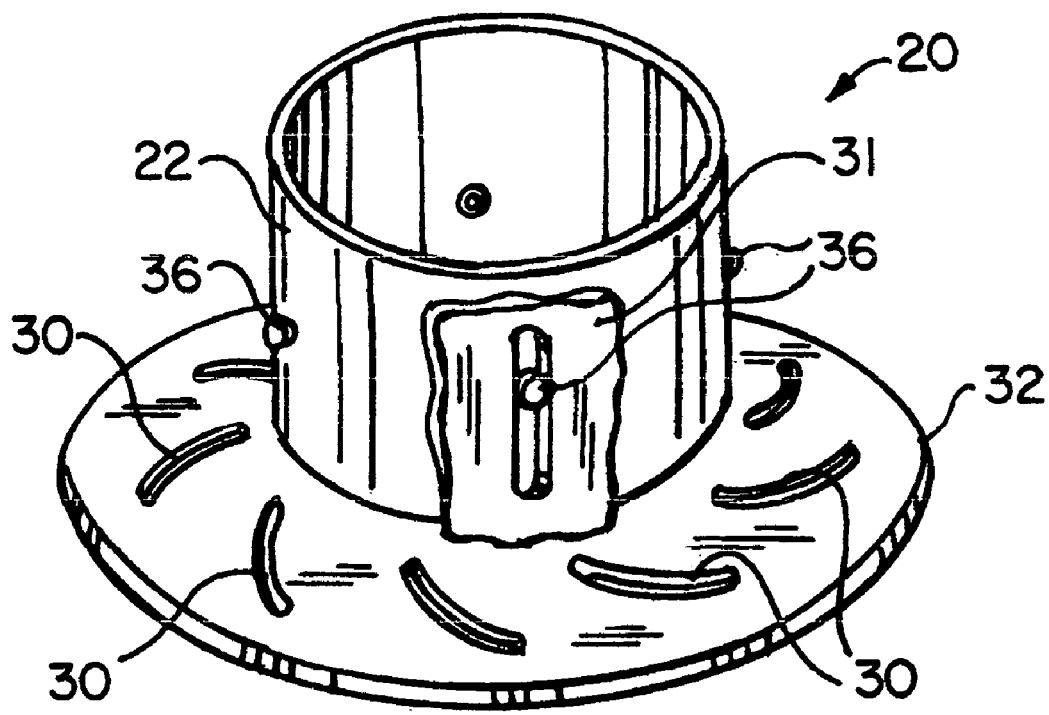
FIG. 1 is a perspective view of a component of a shaping drum within which cam follower assemblies which embody features of the present invention are secured.

Turning now to the drawings in greater detail and considering first FIGS. 1-3, there are illustrated selected components of an embodiment, generally indicated 20, of a shaping drum within which features of the present invention are embodied. One of the depicted components of the shaping drum 20 includes a thin-walled cylinder, or inner sleeve member 22, and a plurality of cam follower assemblies 36 secured within the sidewalls of the sleeve member 22. A roller member, a fragment of which is indicated 31 in FIG. 1, encircles the sleeve member 22, and linkage members (not shown) are pivotally connected to the roller member 31 and have outer ends which are slidably positioned within the grooves 30 (FIG. 1) formed in the end plates 32 (only one shown in FIG. 1) associated with the sleeve member 22.

An internal air cylinder is defined between the outer wall of the sleeve member 22 and the inner wall of the roller member 31 encircling the sleeve member 22 so that actuation or de-actuation of the air cylinder forces the roller member 31 to move lengthwise (vertically as shown in FIG. 1) along the length of the sleeve member 22 and so that the linkage member ends are guided along the grooves 30.

Connected between the inner sleeve member 22 and the roller member 31 are the plurality of (i.e. four) cam assemblies 36, introduced earlier, which are anchored to the inner sleeve member 22 yet cooperate with the roller member 31 in a manner which guides the movement of the roller member 31 along the length of the sleeve member 22 in response to actuation or de-actuation of the internal air cylinder. To this end and with reference to FIGS. 4 and 5, the sleeve member 22 is provided with an internally-threaded bore 40 within which each cam follower assembly 36 is anchored, and each cam follower assembly 36 includes an elongated hub 42 and a cam follower member 44 which is secured about an end portion of the hub 42. In addition, each internally-threaded bore 40 is slightly tapered as a path is traced through the bore 40 so that the diameter of the bore 40 as measured at the outside surface of the sleeve member 22 is slightly smaller than the diameter of the bore 40 as measured at the inside surface of the sleeve member 22. As will be apparent herein, the tapered surfaces of the bore 40, as well as the tapered surfaces of the assembly components described herein, help to promote a tight-fitting relationship (i.e. a zero-clearance fit-up) between the assembled components.

In addition, there is provided an intermediate, or insert, member 50 disposed between the hub 42 and the internal wall of the bore 40 within which the hub 42 is positioned, and a tapered bushing 52 is press-fitted about the stem of the hub 42 prior to the installation of the hub 42 within the insert member 50.

With reference still to FIGS. 4 and 5, the insert member 50 includes a somewhat cylindrically-formed body which externally threaded and which has a tapered central bore 54. The insert member 50 is adapted to be threadably accepted by the internally-threaded bore 40 formed within the wall of the sleeve member 22 and tapered to a shape complimentary to that of the bore 40. To this end, the depicted insert member 50 has an externally-threaded outer surface which is slightly tapered as a path is traced from one end of the insert member 50 toward the other end thereof. More specifically, the diameter of the external threads of the insert member 50 as measured across the rightward end thereof (as viewed in FIGS. 4 and 5) is slightly smaller than is the diameter of the external threads as measured across the leftward end thereof (as viewed in FIGS. 4 and 5) of the external threads so that when the insert 50 is tightly threaded within the internally-threaded bore 40 of the sleeve member 22, there exists zero clearance between the engaging surfaces of the internally-threaded bore 40 and the external threads of the insert member 50.

Meanwhile, the hub 42 has a mounting, or stem, portion 55 which is positionable within the insert member 50 when the cam follower assembly 36 is fully assembled and a support portion 56 about which the cam follower member 44 is positioned. To aid in the eventual securement of the hub 42 within the insert member 50, an internally-threaded (and countersunk) opening 51 is provided within so as to open out of the end of the hub 42 which corresponds with the support portion 56. In addition, the stem portion 55 has a cylindrical outer wall, and the tapered bushing 52 is force-fitted about the outer wall of the stem portion 55 to provide the stem portion 54 with a tapered outer surface 60. The tapered outer surface 60 enhances the ability of the hub stem portion 54 to be force-fitted within the central bore 54 of the insert member 50 when the assembly 36 is secured within the internally-threaded through-opening 40 of the sleeve member 22.

To secure each cam follower assembly 36 within a corresponding one of the internally-threaded openings 40, each internally-threaded opening 40 must be formed, if not formed already. For example, if retrofitting a shaping drum of the prior art so that the retrofitted drum includes the cam follower assemblies 36, previously-formed openings which have been designed to support the hubs of cam follower assemblies of the prior art must be enlarged (i.e. in diameter) and internally threaded (with its desired taper) to threadably accept an insert member 50. Once the openings 40 have been formed, each insert member 50 can be threadably secured within a corresponding opening 40 and positioned deep enough therein (see FIG. 4) to accommodate a washer 70 positioned between the inwardly-facing end surface of the insert member 50 and the sleeve member 22.

Figure 6:
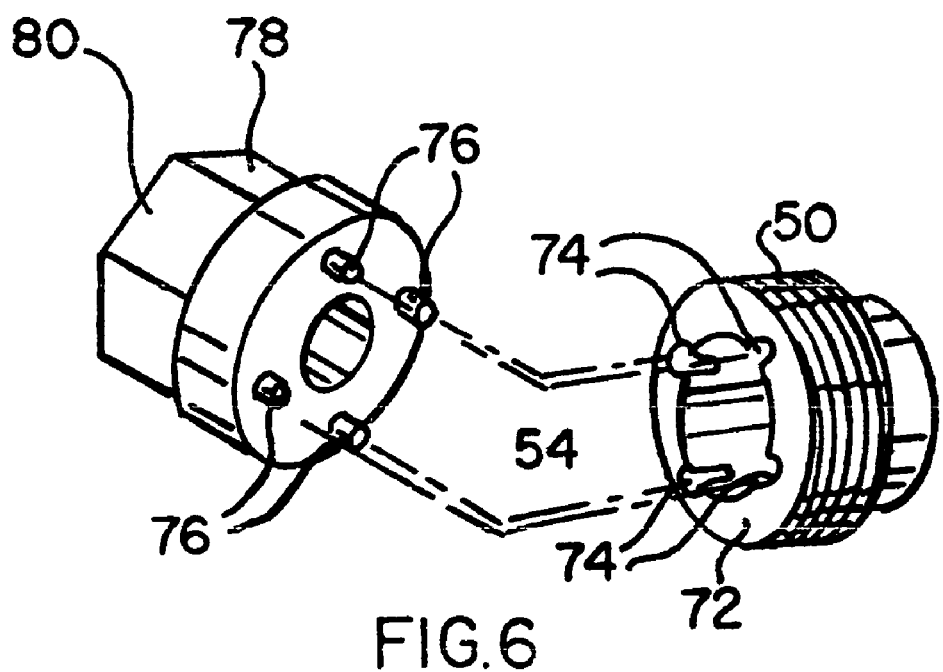
FIG. 6 is a perspective view of the intermediate insert member of the FIG. 1 assembly and a tool with which the insert member is secured within the remainder of the shaping drum.

Within the insert member 50 of each depicted cam follower assembly 36 and with reference to FIG. 6, the insert member 50 includes an inwardly-directed end surface 72 which faces inwardly of the inner sleeve member when secured within a corresponding internally-threaded opening 40 therein, and the end surface defines 72 a plurality of (e.g. four) circular recesses, or openings 74, therein for receiving the pins 76 of a tool 78 used to threadably secure the insert member 50 into the internally-threaded opening 40. As can be seen in the view of FIG. 6, the end portion, indicated 80, of the tool 78 opposite the pin-end of the tool 78 is adapted to accept the end of an appropriately-sized wrench (not shown) for tightening the insert member 50 into place.

Next, the cam follower member 44 is positioned about the support end portion 56 of the hub 42, and the tapered bushing 52 is positioned (i.e. force-fitted) about the mounting portion 55 of the hub 42. The mounting portion 55, with the tapered bushing 52 positioned thereabout, is thereafter force-fitted (from the outboard end thereof) within the central through-bore 54 of the insert member 50. With the hub 42 thus positioned within the insert member 50, a washer 70 is positioned against the inwardly-directed face of the insert member 50, and a screw 82 is directed through the center of the washer 70 and tightened into place within the threaded opening 51 of the hub 42.

It is a feature of the assembly 36 that the length of the insert member 50 within which the mounting portion 55 of the hub 42 is positioned is greater than the thickness of the sleeve member 22. Therefore, the amount of material (i.e. that of the insert member 50) which encircles or surrounds, and thus reinforces or strengthens, the support portion 42 of the hub 42 is greater than would be the case if the support portion 42 were only encircled by the material of the sleeve member 22. In other words, there is a greater amount of surface-to-surface contact between the hub 42 (or, more specifically, the tapered bushing 52) in the assembly 36 than would be the case if there were only surface-to-surface contact between the hub 42 and the inside surface of a bore formed in the sleeve member 22. Thus, the diameter of the mounting portion 55 of the hub 42 is effectively enlarged by the provision of the insert member 50, and the provision of the insert member 50 is advantageous in this respect.

It has been found that during use of the drum 20, the radially-inwardly directed forces exerted upon the insert member 50 are appreciable. However, because the mounting portion 55 of the hub 42 (with the tapered bushing 52 fitted thereabout) is force-fitted into the central through-opening 54 of the insert member 50, the through-opening 54 is slightly enlarged by the hub mounting portion 55 force-fitted therein and reinforced by the hub 42.

It will be understood that numerous modifications and substitutions can be had to the aforedescribed embodiment without departing from the spirit of the invention. Accordingly, the aforedescribed embodiment is intended for the purpose of illustration and not as limitation.

The invention claimed is:

1. In a scroll shaping drum useful in the construction of tires and including an inner, thin-walled sleeve member having a wall defining inner and outer cylindrical surfaces and a roller member positioned about the inner sleeve member and defining an inner cylindrical surface and further including an air cylinder wherein an interior wall of the air cylinder is provided by the outer cylindrical surface and an exterior wall of the air cylinder is provided by the inner cylindrical surface of the roller member and wherein there is provided a plurality of cam follower assemblies wherein each cam follower assembly is anchored within the wall of the inner sleeve member by way of a hub and has a cam follower member positioned about the hub and which is accepted by an appropriately-shaped slot defined in the roller member so that upon actuation or de-actuation of the air cylinder, the roller member is forced along the length of the inner sleeve member as the movement of the roller member is guided by the cooperation between the cam follower members and the slots defined within the roller member, the improvement characterized in that:

the inner sleeve member defines an opening in the wall thereof; and the hub of each cam follower assembly includes a mounting portion which is positionable within the opening of the inner sleeve member and a support portion about which a cam follower member is supported; and the improvement further includes an insert member which is adapted to be accepted by the opening of the inner sleeve member and which has a central through-opening within which the mounting portion of the hub is positioned and which has a length which exceeds the thickness of the wall of the inner sleeve member so that the mounting portion of the hub is surrounded by and thereby reinforced by a greater amount of material than would be the case if the mounting portion were only surrounded by and supported by the material of the wall of the inner sleeve member; and wherein the opening defined in the wall of the inner sleeve member is internally-threaded, and the insert member is externally-threaded and adapted to be threadably accepted by the internally-threaded opening of the inner sleeve member.

2. The improvement as defined in claim 1 wherein the hub of each cam follower assembly includes an axially-extending threaded opening in the end thereof corresponding to the mounting portion thereof and the improvement further comprises a headed fastener having a head and a shank which is threadably received by the axially-extending threaded opening to help secure the mounting portion within the wall of the inner sleeve member.

3. The improvement as defined in claim 2 further comprising a washer interposed between said end of the hub and the head of the headed fastener so that when the headed fastener is tightened within the threaded opening of the hub, the washer member is secured between said end of the hub and the head of the headed fastener.

4. The improvement as defined in claim 1 further comprising a tapered bushing which is positioned about the mounting portion of each hub so that when the mounting portion of the hub is positioned within the through-opening of a corresponding insert member, the tapered bushing is positioned between the outer surface of the mounting portion and the surface of the central through-opening of an insert member.

5. The improvement as defined in claim 1 wherein the opening defined in the wall of the inner sleeve member is tape'red in form in that the outer diameter of the opening as measured across the inner cylindrical surface of the inner sleeve member is slightly larger than the outer diameter of the opening as measured across the outer cylindrical surface of the inner sleeve member, and the insert member has an exterior surface which possesses a complimentary taper to that of the opening defined in the wall of the inner sleeve member.

6. The improvement as defined in claim 1 wherein the mounting portion of the hub is force-fitted within the central through-opening of the insert member.

7. The improvement as defined in claim 1 wherein the insert member includes an end surface which faces inwardly of the inner sleeve member when secured within a corresponding internally-threaded opening therein, and the end surface defines a plurality of openings therein for receiving the pins of a tool used to threadably secure the insert member into the internally-threaded opening.

8. In a scroll shaping drum useful in the construction of tires and including an internal air cylinder, an inner, thin-walled sleeve member having inner and outer cylindrical surfaces wherein the outer cylindrical surface provides an interior wall of the air cylinder, and a roller member positioned about the inner sleeve member and defining an inner cylindrical surface providing an exterior wall of the air cylinder and wherein there is provided between the inner sleeve member and the roller member positioned thereabout a plurality of cam follower assemblies which are each anchored within the inner sleeve member by way of a hub and has a cam follower member positioned about the hub and which is accepted by an appropriately-shaped slot defined in the roller member so that upon actuation or de-actuation of the air cylinder, the roller member is forced along the length of the inner sleeve member as the movement of the roller member is guided by the cooperation between the cam follower members and the slots defined within the roller member, the improvement characterized in that:

the inner sleeve member defines an internally-threaded opening; and the hub of each cam follower assembly includes a mounting portion positionable within the internally-threaded opening of the inner sleeve member and a support portion about which a cam follower member is supported; and the improvement further includes an insert member which is externally threaded and adapted to be threadably accepted by the internally-threaded opening of the inner sleeve member and which has a central through-opening within which the mounting portion of the hub is positioned and which has a length which exceeds the thickness of the wall of the inner sleeve member so that the mounting portion of the hub is surrounded and thus reinforced by a greater amount of material than would be the case if the mounting portion were only surrounded and thus reinforced by the material of the wall of the inner sleeve member.

9. The improvement as defined in claim 8 wherein the hub of each cam follower assembly includes an axially-extending threaded opening in the end thereof corresponding to the mounting portion thereof and the improvement further comprises a headed fastener having a head and a shank which is threadably received by the axially-extending threaded opening to help secure the mounting portion within the wall of the inner sleeve member.

10. The improvement as defined in claim 9 further comprising a washer interposed between said end of the hub and the head of the headed fastener so that when the headed fastener is tightened within the threaded opening of the hub, the washer member is secured between said end of the hub and the head of the headed fastener.

11. The improvement as defined in claim 8 further comprising a tapered bushing which is positioned about the mounting portion of each hub so that when the mounting portion of the hub is positioned within the through-opening of a corresponding insert member, the tapered bushing is positioned between the outer surface of the mounting portion and the surface of the central through-opening of an insert member.

12. The improvement as defined in claim 8 wherein the internally-threaded opening defined in the wall of the inner sleeve member is tapered in form in that the outer diameter of the internally-threaded opening as measured across the inner cylindrical surface of the inner sleeve member is slightly larger than the outer diameter of the internally-threaded opening as measured across the outer cylindrical surface of the inner sleeve member, and the externally-threaded surface of the insert member possesses a complimentary taper to that of the internally-threaded opening defined in the wall of the inner sleeve member.

13. The improvement as defined in claim 8 wherein the mounting portion of the hub is force-fitted within the central through-opening of the insert member.

14. The improvement as defined in claim 8 wherein the insert member includes an end surface which faces inwardly of the inner sleeve member when secured within a corresponding internally-threaded opening therein, and the end surface defines a plurality of openings therein for receiving the pins of a tool used to threadably secure the insert member into the internally-threaded opening.

15. In a scroll shaping drum useful in the construction of tires and including an internal air cylinder, an inner, thin-walled sleeve member having inner and outer cylindrical surfaces wherein the outer cylindrical surface provides an interior wall of the air cylinder, and a roller member positioned about the inner sleeve member and defining an inner cylindrical surface providing an exterior wall of the air cylinder and wherein there is provided between the inner sleeve member and the roller member positioned thereabout a plurality of cam follower assemblies which are each anchored within the inner sleeve member by way of a hub and has a cam follower member positioned about the hub and which is accepted by an appropriately-shaped slot defined in the roller member so that upon actuation or de-actuation of the air cylinder, the roller member is forced along the length of the inner sleeve member as the movement of the roller member is guided by the cooperation between the cam follower members and the slots defined within the roller member, the improvement characterized in that:

the inner sleeve member defines an internally-threaded opening; and the hub of each cam follower assembly includes a mounting portion positionable within the internally-threaded opening of the inner sleeve member and a support portion about which a cam follower member is supported; and the improvement further includes an insert member which is externally threaded and adapted to be threadably accepted by the internally-threaded opening of the inner sleeve member and which has a central through-opening within which the mounting portion of the hub is positioned and which has a length which exceeds the thickness of the wall of the inner sleeve member and surrounds and thus reinforces the mounting portion of the hub.

16. The improvement as defined in claim 15 wherein the hub of each cam follower assembly includes an axially-extending threaded opening in the end thereof corresponding to the mounting portion thereof and the improvement further comprises a headed fastener having a head and a shank which is threadably received by the axially-extending threaded opening and a washer interposed between said end of the hub and the head of the headed fastener so that when the headed fastener is tightened within the threaded opening of the hub, the washer member is secured between said end of the hub and the head of the headed fastener.

17. The improvement as defined in claim 15 further comprising a tapered bushing which is positioned about the mounting portion of each hub so that when the mounting portion of the hub is positioned within the through-opening of a corresponding insert member, the tapered bushing is positioned between the outer surface of the mounting portion and the surface of the central through-opening of an insert member, and the mounting portion of the hub is thereby tightly fitted within the central through-opening of the insert member.

18. The improvement as defined in claim 15 wherein the internally-threaded opening defined in the wall of the inner sleeve member is tapered in form in that the outer diameter of the internally-threaded opening as measured across the inner cylindrical surface of the inner sleeve member is slightly larger than the outer diameter of the internally-threaded opening as measured across the outer cylindrical surface of the inner sleeve member, and the externally-threaded surface of the insert member possesses a complimentary taper to that of the internally-threaded opening defined in the wall of the inner sleeve member.

19. The improvement as defined in claim 15 wherein the insert member includes an end surface which faces inwardly of the inner sleeve member when secured within a corresponding internally-threaded opening therein, and the end surface defines a plurality of openings therein for receiving the pins of a tool used to threadably secure the insert member into the internally-threaded opening.

* * * * *